United States Patent Office 3,050,517
Patented Aug. 21, 1962

3,050,517
PURINE 6-THIO-GLYCOSIDES
George H. Hitchings, Yonkers, Gertrude B. Elion, Bronxville, and Irving Goodman, White Plains, N.Y., assignors to Burroughs Wellcome & Co. (U.S.A.) Inc., Tuckahoe, N.Y., a corporation of New York
No Drawing. Filed Oct. 11, 1957, Ser. No. 689,492
Claims priority, application Great Britain June 22, 1955
8 Claims. (Cl. 260—209)

The present invention relates to a family of purine 6-thioglycosides which may be represented by the formula

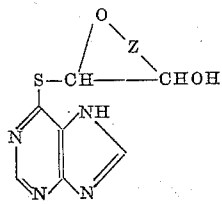

wherein

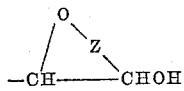

represents the ring oxygen and the number 1 and 2 carbon atoms of a glycoside ring, Z is the remainder of the glycoside ring, which may be pyranose or furanose in type, and which may be derived from a normal sugar, a desoxy sugar such as rhamnose or a glycuronic acid such as glucuronic acid or galacturonic acid. The purine moiety is unsubstituted in the imidazole ring but may have a substitution in the 2-position e.g., it may be derived from thioguanine or an N-substituted thioguanine.

These compounds are useful as growth inhibitors. This activity may be the result of cleavage of the glycoside to liberate the heterocyclic mercaptan which itself has growth-inhibitory activity. Such a mechanism is known to occur. Thus 6-purinylthioglucopyranoside is known to be hydrolyzed by an intestinal enzyme which liberate 6-mercaptopurine. However, this does not fully account for the activity of the thioglucoside, for the latter is active when given intraperitoneally, in which event the hydrolysis is minimal; furthermore, the thioglucoside is active, when given intraperitoneally, against a strain of adenocarcinoma 755 which is resistant to 6-mercaptopurine. 6-Purinylthioglucoside has been shown to have activity against a spectrum of animal tumors including sarcoma 180, adenocarcinoma 755, the spontaneous mammary carcinoma of $C_3H$ mice, carcinoma E0771, mouse glioma and Ridgeway osteogenic sarcoma.

These thioglycosides are obtained by two general routes, both of which have several minor variations. All the variations are applicable to the preparation of purine 6-thioglucopyranoside and are exemplified in its preparation. Certain variations are alone applicable in certain connections as will appear later.

The first major route involves reaction of the anion of a 6-mercaptopurine with a halo-aceto sugar, e.g. bromacetoglucose.

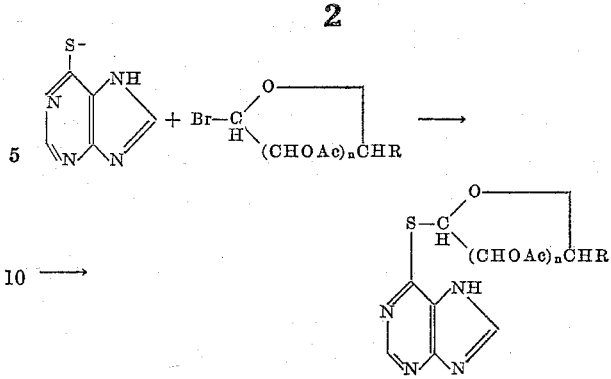

The anionic condition of the 6-mercaptopurine may be produced by addition of a suitable base and variations in these bases constitute the principal variations in the method. Thus Method I-A employs aqueous alkali, Method I-B alcoholic ammonia, and Method I-C liquid ammonia.

The second route utilizes the reaction of a 6-halopurine with the anion of a thiosugar, e.g. by using sodium 6-thioglucopyranoside through Method II-A. By a variation Method II-B the 6-halopurine is reacted with an acetylated thiosugar in alcoholic alkali which simultaneously removes the acetyl groups by ester exchange and converts the thiosugar to its anionic condition.

EXAMPLE I (Method I-A)

*Purine-6-Glucothiopyranoside*

5 g. of 6-mercaptopurine was dissolved in 150 ml. of 0.226 N potassium hydroxide, and 12 g. of 2,3,4,6-tetraacetyl-α-d-glucopyranosylchloride was added. The solution was stirred at room temperature for about 4 hours by which time the pH of the solution had fallen to a value of approximately 7. Yield 11.2 g. of crude product, 6-tetraacetylglucopyranosylmercaptopurine.

The acetylated compound (5 g.) was dissolved in 250 ml. of absolute ethanolic ammonia solution (previously saturated at 0°) and allowed to stand over night at room temperature. The product was collected by filtration and recrystallized from absolute ethanol. It melts with decomposition at about 125°.

When recrystallized from isopropanol it formed a diisopropanolate. It shows extinction maxima in the ultraviolet at 280 m$\mu$ at pH 1 and 285 m$\mu$ at pH 11.

EXAMPLE II (Method II-B)

*Purine-6-Glucothiopyranoside*

75 g. (0.44 M) of 6-mercaptopurine monohydrate was dissolved in 600 ml. concentrated $NH_4OH$. To this solution was added a solution containing 180 g. (0.49 M) of 1-chloro-2,3,4,6-tetraacetyl glucopyranose (chloracetoglucose) in 500 ml. absolute ethanol. Moderate evolution of heat was observed. The mixture was allowed to stand overnight at room temperature. The solution was then concentrated in vacuo on the steam bath until just cloudy. The cloudy solution was allowed to stand for two hours at 0° C. and was filtered and washed with 95% ethanol. 87 grams of impure product was obtained. From the filtrate a second precipitate was obtained within about 10 minutes after filtration. This material (25 g.) was pure purine-6-glucothiopyranoside. An additional 25 g. was obtained by purification of the first precipitate and from the mother liquors.

EXAMPLE III
(Method I–C)
6-Purinylglucopyranthiouronide 5 g. 6-mercaptopurine monohydrate was dissolved in 200 ml. liquid $NH_3$. To this solution was added 12 g. methyl-1-chloro-2,3,4-triacetylglucopyranuronate while stirring with the magnetic stirrer. The solution was stirred for 1 hour, and the liquid $NH_3$ then gently boiled off. To the solid residue was added 50 ml. absolute alcohol. The solid was removed by filtration, triturated and then washed with absolute ethanol. The product was isolated in the form of the ammonium salt. M.P. 205–7°.

EXAMPLE IV
(Method II–A)
Purine-6-Glucothiopyranoside

Five grams (0.02 M) of sodium thioglucose dihydrate were dissolved in 40 ml. of water at room temperature. To this solution was added a solution of 3 g. (0.02 M) of 6-chloropurine in 20 ml. of absolute ethanol. The clear solution was placed on the magnetic stirrer for 2 hours at room temperature. A fine white precipitate formed in the reaction mixture. The precipitate was removed by filtration on the water pump and was washed with 5 cc. cold water. Five and four-tenths grams of dry product were obtained. A second crop weighing 1.3 g. was obtained from the filtrate after standing at 0° for 3 days. Yield 92% of theory. The ultraviolet absorption characteristics were identical with those of an authentic sample prepared by the previously described method from 6-mercaptopurine.

EXAMPLE V
(Method II–B)
6-Purinylglucothiopyranoside 1 gram (0.0025 M) of 1-thioacetyl-2,3,4,6-tetraacetyl-glucopyranose (M.W. 405.75) was dissolved in 20 ml. absolute methanol. To this solution was added a solution of 0.38 g. (0.0025 M) of 6-chloropurine (M.W. 155) in 25 ml. absolute methanol. To the mixture was added a solution of 0.29 gram sodium methoxide (M.W. 118) in 20 ml. absolute methanol. The mixture was filtered and left at room temperature overnight. The solid residue was removed by filtration and the filtrate concentrated to a syrup in vacuo. The syrup was treated with 25 ml. absolute ethanol. The ethanol insoluble precipitate was separated by filtration. The product, 6-purinylglucothiopyranoside, was identical with an authentic sample previously prepared by other methods.

EXAMPLE VI
(Method II–B)
6-Purinylthiolactoside 5 g. of 1-thioacetyl hepta acetyl lactose was dissolved in 75 ml. absolute ethanol. To the ethanolic solution was added 1.1 g. solid 6-chloropurine and a solution of 0.2 g. Na in 25 ml. absolute ethanol. Upon addition of the sodium ethoxide solution a faint turbidity developed but disappeared on stirring. The mixture was left at room temperature for 18 hours. 2.5 grams of 6-purinylthiolactoside was obtained. U.V.λ max. 280 m$\mu$ in $H_2O$. Upon hydrolysis in 0.1 N HCl for 5 minutes on the steam bath, 6-mercaptopurine was formed.

EXAMPLE VII
6-Glucuronosylmercaptopurine

By the procedure of Example I, using methyl 1-chloro-2,3,4-triacetyl-α-d-glucopyranuronate, the corresponding derivative of glucuronic acid was prepared. It decomposed in the range 183–188°. It showed maxima of ultraviolet absorption at 281 m$\mu$ (pH 1) and 286 m$\mu$ (pH 11).

EXAMPLE VIII
(Method I–B)
2-Aminopurine-6-glucothiopyranoside 10 g. (0.06 M) of thioguanine was dissolved in 150 ml. concentrated $NH_4OH$. To this was added a solution containing 24 g. chloracetoglucose in 80 ml. absolute ethanol. The mixture was left overnight at room temperature. It was then concentrated in vacuo until incipient precipitation. After removing 3 fractions of unreacted thioguanine mixed with glucoside, a 1 g. fraction of pure glucoside was obtained.

This compound has also been prepared by the methods of Examples 1 and 3. Its formation is always accompanied by that of 6-(2-glucosylaminopurinyl) glucothio pyranoside. Separation can be accomplished by passing a solution of these two compounds in 5% isopropanol-94% water-1% conc. $NH_4OH$ through a column of powdered cellulose. Under these conditions the monoglycoside is absorbed more strongly and is obtained from the later fractions of the eluate.

EXAMPLE IX
(Method I–B)
6-Purinylgalactothiopyranoside 5 g. of 6-mercaptopurine monohydrate was dissolved in 40 ml. of concentrated $NH_4OH$ (sp. gr. 0.90). To this solution was added a suspension of 12 g. of 1-chloro-2,3,4,6-tetraacetylgalactopyranose in 35 ml. absolute ethanol. The mixture was stirred at room temperature for five hours or until all the solid had dissolved. It was then left for 18 hours at room temperature. The solution was concentrated in vacuo to a syrup. 10 ml. of $H_2O$ was added to the syrup. The solution became cloudy and after ½ hour was filtered to remove unreacted 6-mercaptopurine. Upon standing for 18 hours at room temperature a precipitate of 6-purinylgalactothiopyranoside was formed. Product 2.8 gm.λ max. pH 1, 280 m$\mu$; pH 11, 285 m$\mu$.

EXAMPLE X
(Method I–B)
6-Purinylrhamnothiopyranoside

To a solution of 5 g. 6-mercaptopurine monohydrate in 40.0 ml. concentrated $NH_4OH$ (sp. gr. 0.90) was added a suspension of 9 g. 1-chloro-2,3,4-triacetyl L-rhamnopyranose in 35 ml. absolute ethanol. The chloroacetyl rhamnose dissolved slowly over 4 hours. After standing at room temperature for 18 hours, the solution was concentrated to a syrup in vacuo. 50 ml. of $H_2O$ was added to the syrup with stirring. A precipitate of unreacted 6-mercaptopurine (1.5 g.) formed in 5 minutes. After standing for 1 hour the precipitate was removed by filtration and the aqueous filtrate was concentrated to 25 ml. and left at 0° C. for 18 hours. Acetone was added to this solution until incipient cloudiness. Upon standing for ½ hour at room temperature a fine white crystalline precipitate of 6-purinyl rhamnothiopyranoside was formed (2.1 gm.) U.V.λ max. 282 m$\mu$ in $H_2O$ (pH 6); 280 m$\mu$ at pH 11.

EXAMPLE XI
(Method I–C)
6-Purinylglucofuranthiouronide 5 grams of 6-mercaptopurine monohydrate was dissolved in 200 ml. liquid $NH_3$. 8 g. of 1-chloro-2,5, diacetylglucuronolactone was added to the ammoniacal solution and the product was isolated, as in Example 3, as the ammonium salt. M.P. 185–190° C. U.V.λ max. at pH 7, 280 m$\mu$.

This application is a continuation-in-part of application Ser. No. 539,271, filed Oct. 7, 1955, and now abandoned.

What we claim is:
1. A purine 6-thioglycoside.
2. A purine 6-thioglycoside wherein the purine moiety is substituted only in the pyrimidine ring and wherein the glycoside moiety is derived from a member of the class consisting of the normal sugars, the desoxysugars and the glycuronic acids.
3. 6-purinyl-d-glucothiopyranoside.
4. 6-purinyl-d-glucopyranthiouronide.
5. 6-purinyl-d-thiolactoside.
6. 6-purinyl-d-glucofuranthiouronide.
7. 6-(2-aminopurinyl)-d-glucothiopyranoside.
8. The process of preparing a 6-purinylglycoside that comprises reacting in the presence of a base a compound Pu-X with a compound Gly-Z wherein Pu is a purine moiety having X attached in the 6 position, Gly is a sugar moiety having Z attached in place of the reducing hydroxyl group, and X and Z are different radicals, one being SH and the other being a halogen atom of atomic weight over 30.

References Cited in the file of this patent

Proc. Soc. Expl. Biol. Med. 84, pp. 409–412 (1953).